(12) United States Patent
Sekiguchi et al.

(10) Patent No.: US 6,315,504 B1
(45) Date of Patent: Nov. 13, 2001

(54) TWIST DRILL

(75) Inventors: Toru Sekiguchi, Ohyamamachi; Yoshiro Suzuku, Toyama, both of (JP)

(73) Assignee: Nachi-Fujikoshi Corporation, Toyama (JP)

( * ) Notice: Subject to any disclaimer, the term of this patent is extended or adjusted under 35 U.S.C. 154(b) by 0 days.

(21) Appl. No.: 09/427,706

(22) Filed: Oct. 27, 1999

(30) Foreign Application Priority Data

Oct. 27, 1998 (JP) .................................................. 10-305824

(51) Int. Cl.$^7$ ...................................................... B23B 51/02
(52) U.S. Cl. ............................ 408/144; 408/229; 408/230; 407/63
(58) Field of Search ................................ 408/144, 145, 408/229, 230; 407/63, 118, 119

(56) References Cited

U.S. PATENT DOCUMENTS

| | | | |
|---|---|---|---|
| 750,537 | * | 1/1904 | Hanson .................................. 408/230 |
| 3,387,511 | * | 6/1968 | Ackart, Sr. et al. .................. 408/230 |
| 4,756,650 | * | 7/1988 | Wakihira et al. ..................... 408/230 |
| 5,078,554 | * | 1/1992 | Kubota .................................. 408/230 |
| 5,186,739 | * | 2/1993 | Isobe et al. ......................... 407/119 X |
| 5,431,072 | * | 7/1995 | Christoffel ............................ 76/115 |
| 5,597,272 | * | 1/1997 | Moriguchi et al. ................... 407/119 |
| 5,622,462 | * | 4/1997 | Gakhar et al. ....................... 408/230 |

* cited by examiner

Primary Examiner—Henry Tsai
(74) Attorney, Agent, or Firm—Venable; George H. Spencer; Robert Kinberg

(57) ABSTRACT

An improved twist drill is provided which reduces wear or chippings of the major cutting edges (3) and those of the leading edges (7) of land (9) and which has a long service life and stays sharp. A twist drill has a pair of chip discharge flutes (6), a pair of chisel edges (1), a pair of inner cutting edges (2) and a pair of major cutting edges (3) extending from each outer end of the inner cutting edges (2). Further, the drill has a pair of outer cutting edges (4) each receding from each of the major cutting edges (3) at an angle (α1), and a pair of leading edges (7) of lands (9) each formed by the land (9) and the outer cutting edge (4) and has a linear or curved rake face (8). Wherein, an angle (α4) of the leading edge (7) of land (9) between the leading edge (7) of the land (9) between the leading edge (7) of the land (9) and the linear or curved rake face (8) is an obtuse angle.

8 Claims, 4 Drawing Sheets

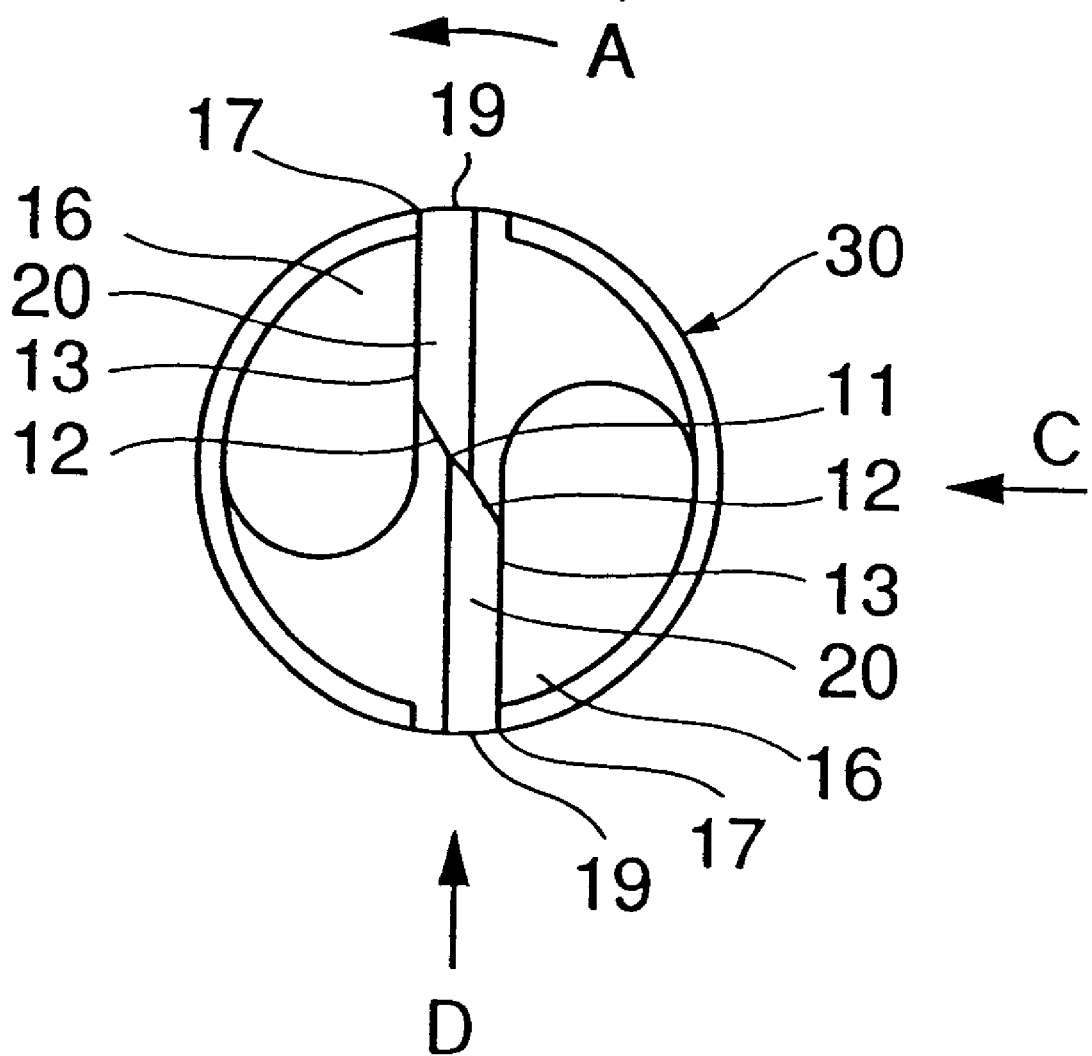

TWIST DRILL

BACKGROUND OF THE INVENTION (1) Field of the Invention

The present invention relates to a twist drill suitable for use in a boring of a hole without using cutting oil or in that while spraying a very small quantity of cutting oil onto frank faces of a tip end portion of the twist drill. More particularly, the present invention relates to a twist drill which is made of a high-speed steel or a cemented carbide. Further, the present invention relates to a twist drill in that at least on the tip end portion of the twist drill is coated with a Ti-based hard material film comprising at least one layer of TiN, TiC, TiCN, TiAlN or TiAlNC.

(2) Description of the Related Art

One example of a conventional twist drill is shown in FIGS. 3(a) to (d) and FIG. 4. As seen in FIG. 3(a), the prior art twist drill has a drill body 30 rotatable about an axis in a drill rotation direction (arrow A), a pair of chip discharge flutes 16 formed in the outer peripheral surface of the drill body 30, a pair of chisel edges 11 formed on a tip end of the drill body 30, a pair of inner cutting edges 12 extending from each outer end of the chisel edges 11 and a pair of major cutting edges 13 extending from each outer end of the inner cutting edges 12 forming substantially straight lines. Also from FIGS. 3(c) and (d), a pair of the major cutting edges 13 are configured as ridge lines formed by both the flutes 16 and flank faces or flanks 20 having an angle $\alpha 11$ and a relief angle of $\alpha 12$. As seen in the cross-sectional view shown in FIG. 4, each flute 16 exhibits a configuration formed by one curve or a combination of a plurality of curves having a point angle $\alpha 11$. Since each major cutting edge 13 is formed as a substantially straight line, the leading edge 17 of the land 19 formed by both the land 19 and the flute 16 has a positive rake angle of $\alpha 13$. Further, each leading edge 17 forms an acute angle of $\alpha 14$.

Generally, in a boring of a hole using cutting oil, wear or chippings of the cutting edges are reduced by a cooling effect caused by the cutting oil. However, in a boring of a hole without using cutting oil or in that while spraying a very small quantity of cutting oil onto frank faces of a tip end portion of a twist drill, since no cooling effect is caused by the cutting oil, the wear or the chipping of each cutting edge occurs. As seen in the cross-sectional view shown in FIG. 4, when each leading edge 17 of the land 19 has an acute angle of $\alpha 14$, the outer comer 15 formed by the flute 16, flank 20 and the land 19 has a sharp configuration and especially the wear or the chipping rapidly occurs at the outer corner 15 of the major cutting edge 13 where the cutting speed is maximum. When using cutting oil, chips or machined material generated by the boring of the hole are transferred and smoothly discharged out through the spaces formed between the bored hole and the chip discharge flutes by the aid of the lubricant effect of the cutting oil. However, in a boring of a hole without using cutting oil, no such lubricant effect is effected. Thereby, a large frictional resistance occurs, resulting in chippings of the leading edge 17 of the land 19 occurring. That is, when the leading edge 17 of the land 19 has a sharp configuration or a positive angle, the leading edge 17 is prone to chipping.

SUMMARY OF THE INVENTION

An object of the present invention is to provide an improved twist drill which overcomes the above-described problems. The twist drill results in reduced wear or chippings of the major cutting edges and those of the leading edges of the lands, has a long service life and stays sharp, and is suitable for use in a boring of a hole without the use cutting oil or spraying a very small quantity of cutting oil onto the frank faces of the tip end portion of the twist drill.

Another object of the present invention is to provide an improved twist drill which is made of a high-speed steel or a cemented carbide suitable for use in such boring of the hole.

Another object of the present invention is to provide an improved twist drill wherein at least on the tip end portion of the twist drill is coated with a Ti-based hard material film comprising at least one layer of TiN, TiC, TiCN, TiAlN or TiAlNC suitable for use in such boring of the hole.

In order to achieve the above-mentioned objects, a twist drill according to the present invention comprises a drill body rotatable about an axis in a drill rotation direction and a pair of chip discharge flutes formed in the outer peripheral surface of the drill body. A pair of chisel edges are formed on a tip end of the drill body, and a pair of inner cutting edges extend from each outer end of the chisel edges. A pair of major cutting edges extend from each outer end of the inner cutting edges. Further, a pair of outer cutting edges are formed each receding relative to the drill rotation midway back from each of the major cutting edges at an angle $\alpha 1$ in a counter-direction of the drill rotation, and a pair of leading edges of the lands each are formed by the flute and the outer cutting edge and has a linear or curved rake face. Wherein, an angle $\alpha 4$ of the leading edge of the land between the land and the linear or curved rake face of the leading edge is made to form an obtuse angle.

By such an arrangement, since the leading edge of the land of the twist drill of the present invention has an obtuse angle, the toughness in the outer cutting edges and the leading edge of the land is strengthened thereby reducing wear or chippings of the major cutting edges. Wear of the outer cutting edges and of the leading edges of the lands are reduced, thereby enabling the twist drill according to the present invention to have a long service life and stay sharp. Also, the twist drill according to the present invention is suitable for use in a boring of a hole without using cutting oil or, in that while spraying a very small quantity of cutting oil onto the frank faces of the tip end portion of the twist drill, reducing wear or chippings of the major cutting edges, of the outer cutting edges and of the leading edges of the lands.

Preferably, the length of one of the outer cutting edges ranges from 0.05 to 0.20 of the diameter of the twist drill. By this arrangement, while the major cutting edges keep a good cutting action, the outer cutting edges and the leading edges of the lands enable the reduction of wear or chippings thereof.

Preferably, the angle $\alpha 1$ between the major cutting edge and the outer cutting edge ranges from 150 to 175°, in order to secure an adequate obtuse angle $\alpha 4$ of the leading edge of the land.

More preferably, the twist drill is made of a high-speed steel, or made of a cemented carbide to secure high wear resistance.

Preferably, the twist drill, at least on the tip end portion of the twist drill, is coated with a Ti-based hard material film comprising at least one layer of TiN, TiC, TiCN, TiAlN or TiAlNC to further reduce wear or chippings on its major cutting edges and on its leading edges of the lands.

BRIEF DESCRIPTION OF THE DRAWINGS

The present invention is illustrated by way of example and not limitation in the accompanying drawings, in which like reference numerals indicate like parts, and in which:

FIG. 3(b) is a tip end plan view of the prior art drill shown in FIG. 3(a).

DETAILED DESCRIPTION OF THE PREFERRED EMBODIMENTS

Figure 1A:
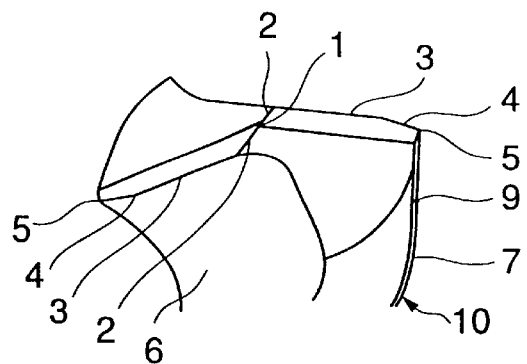
FIG. 1(a) is a perspective view illustrating a tip end portion of a twist drill according to a preferred embodiment of the present invention.
Figure 1B:
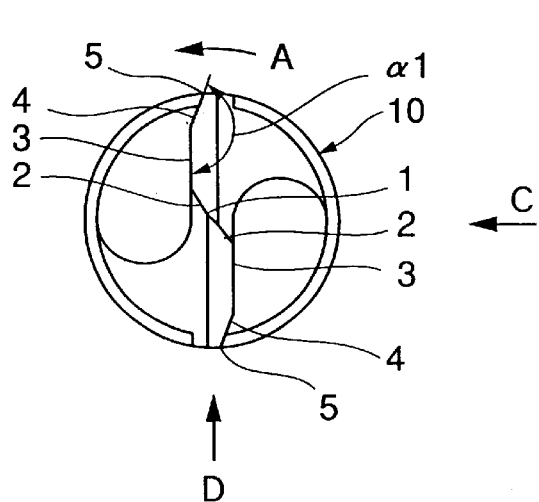
FIG. 1(b) is a tip end plan view of the drill shown in FIG. 1(a).
Figure 1C:
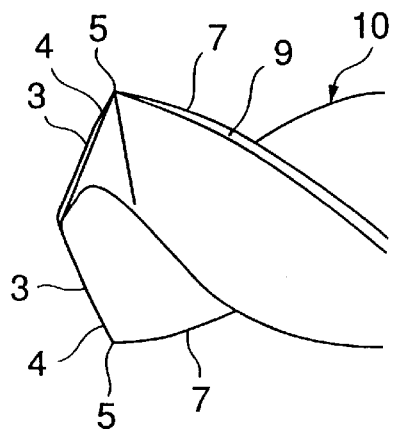
FIG. 1(c) is a side elevational view of the drill as viewed in the direction of the arrow C in FIG. 1(b).
Figure 1D:
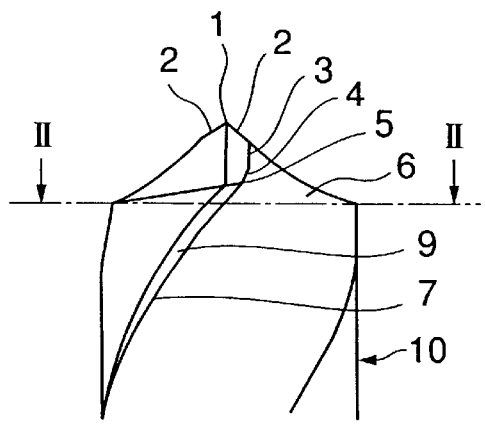
FIG. 1(d) is a side elevational view of the drill as viewed in the direction of the arrow D in FIG. 1(b).
Figure 2:
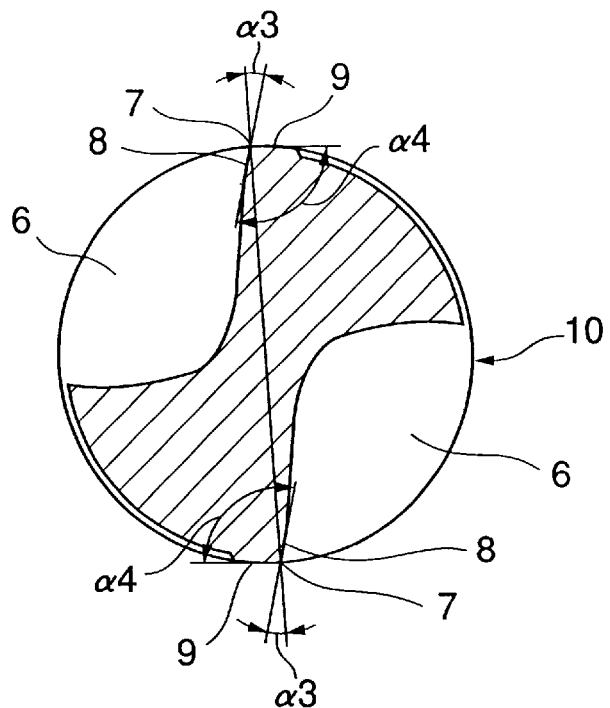
FIG. 2 is an enlarged view of a section normal to the axis of the drill taken along the line II—II in FIG. 1(d).

Referring to the accompanying drawings, a detailed description of a preferred embodiment of the present invention will be given hereunder. As illustrated in FIGS. 1(a) to (d) and FIG. 2, showing a tip end portion of a twist drill according to a preferred embodiment of the present invention, the twist drill has a drill body 10 rotatable about an axis in a drill rotation direction shown in the arrow A and a pair of chip discharge flutes 6 formed in the outer peripheral surface of the drill body 10. A pair of chisel edges 1 are formed on a tip end of the drill body 10, and a pair of inner cutting edges 2 extend from each outer end of the chisel edges 1. A pair of major cutting edges 3 extend from each outer end of the inner cutting edges 2. Further, a pair of outer cutting edges 4 are formed each receding relative to the drill rotation midway back from each of the major cutting edges 3 at an angle α1 in a counter-direction of the drill rotation, and a pair of leading edges 7 of the lands 9 each are formed by the land 9 and the outer cutting edge 4 and has a linear or curved rake face 8. Wherein, an angle α4 of the leading edge 7 of the land 9 between the land 9 and the linear or curved rake face 8 of the leading edge 7 is made to form an obtuse angle. An angle α1 between the rake face 8 and a plan passing through the drill axis, so-called a rake angle, is made to be a negative angle.

Preferably, in order to reduce wear or chippings of the outer cutting edges 4 and the leading edges 7 of the land 9 while keeping a good cutting action of the major cutting edges 3, the length of one of the outer cutting edges 4 is set to range from 0.05 to 0.20 of the diameter of the twist drill. In this connection, the length of the rake face 8 is also set to range from 0.05 to 0.20 of the diameter of the twist drill.

Preferably, in order to secure an adequate obtuse angle α4 of the leading edge 7 of the land 9, the angle α1 between the major cutting edge 3 and the outer cutting edge 4 is set to range from 150 to 175°.

Since the present invention is characterized in the configuration of at least the outer cutting edges 4 each receding midway back from each major cutting edge 3 and the angle α4 of the leading edge 7 of the land 9 or margin between the rake face 8 and the land 9 or margin is made to form an obtuse angle, the twist drill of the present invention will perform similarly irrespective of the material thereof. However, preferably, the twist drill of the present invention is made of a high-speed steel, or is made of a cemented carbide to secure a high wear resistance.

More preferably, the twist drill of the present invention, at least on the tip end portion of the twist drill, is coated with a Ti-based hard material film comprising at least one layer of TiN, TiC, TiCN, TiAlN or TiAlNC to further reduce wear or chippings on its major cutting edges and on its leading edges of the lands.

EXAMPLE 1

Figure 4:
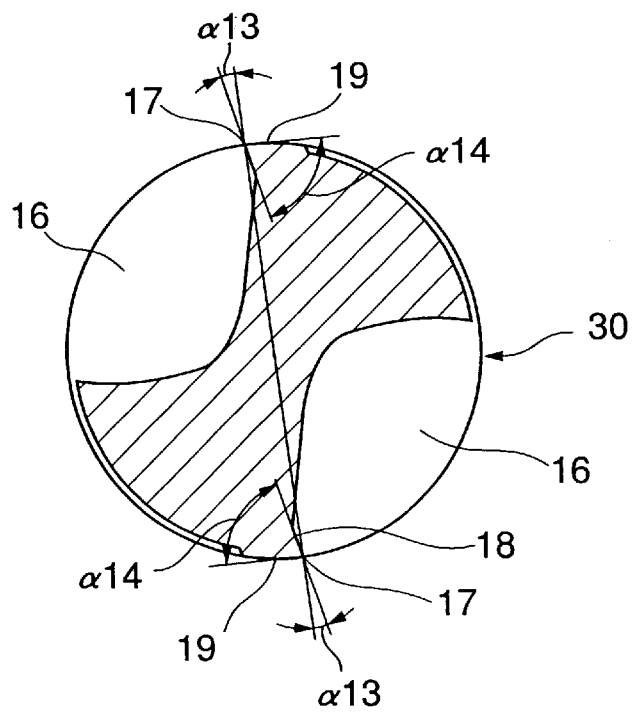
FIG. 4 is an enlarged view of a section normal to the axis of the prior art drill taken along the line IV—IV in FIG. 3(d).
Figure 3A:
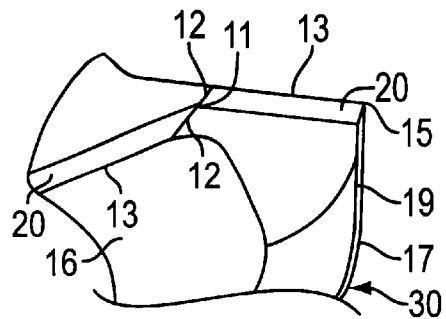
FIG. 3(a) is a perspective view illustrating a tip end portion of a prior art twist drill.
Figure 3C:
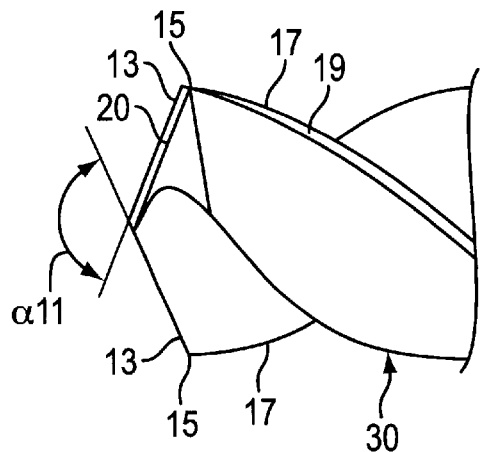
FIG. 3(c) is a side elevational view of the prior art drill as viewed in the direction of the arrow C in FIG. 3(b).
Figure 3D:
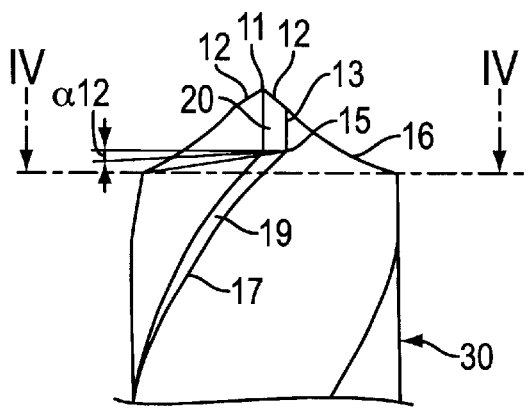
FIG. 3(d) is a side elevational view of the prior art drill as viewed in the direction of the arrow D in FIG. 3(b).

A first comparative cutting test of boring of holes without using coolant oil is conducted as an Example 1 using three twist drills of the present invention having configuration as shown in FIGS. 1(a) to (d) and FIG. 2, each made of a cemented carbide and coated with a hard material film of TiAlN, and conventional three twist drills having configuration as shown in FIGS. 3(a) to (d) and FIG. 4, each made of a cemented carbide and coated with a hard material film of TiAlN.

The length of the outer cutting edge 4 of the tested drills of the present invention is made to be 0.10 (0.6mm) of the diameter of the drill, and the angle α1 between the major cutting edge 3 and the outer cutting edge 4 is made at an angle of 160°. At the same time, its rake angle α3 is made 20° and the angle α4 of its leading edge 7 of the land 9 or margin is made at an angle of 110°, respectively.

The cutting test is conducted these conditions hereunder:
Drill size; diameters Φ6 mm×the total length 72 mm ×the flute length 28 mm
Material of works; Alloy steel JIS SCM440
Cut depth of the hole to be bored; 15 mm through hole
Cutting speed; 30 m/min
Feed rate; 0.2 mm/rev
Coolant; Dry cut

TABLE 1

| | Total numbers of bored holes | | | |
|---|---|---|---|---|
| | 1st drill | 2nd drill | 3rd drill | Mean values |
| Drills of the present invention carbide + TiAlN film | 7397 | 7535 | 8033 | 7655 |
| Conventional drills carbide + TiAlN film | 1229 | 311 | 1566 | 1035 |
| Drills of the present invention HSS + TiN film | 532 | 509 | 588 | 543 |
| Conventional drills HSS + TiN film | 88 | 76 | 80 | 81 |

The results are shown in Table 1, on the upper half thereof. From there, it will be seen that the conventional drills made of the cemented carbide and coated with the hard material film of TiAlN exhibited poor results in that the total or life numbers of bored holes of each of the ranged from 311 to 1566; mean value: 1035. These drills all showed rapid wear and chippings of their outer corners and leading edges of the land.

Contrary to the conventional drills, the twist drills of the present invention made of the cemented carbide and coated with the hard material film of TiAlN exhibited excellent results that the total or life numbers of bored holes of each of the drills ranged from 7397 to 8033; mean value: 7655. Each of the drills of the present invention prolonged its life to more than seven (7) times as compared with those of the conventional drills, showed a very small amount of wear and chippings of its outer corners and the leading edges of the lands or margins, and enabled a long service life that stays sharp.

EXAMPLE 2

A second comparative cutting test of boring of holes without using coolant oil is conducted as an Example 2 using three twist drills of the present invention having configuration as shown in FIGS. 1(a) to (d) and FIG. 2, each made of a high-speed tool steel and coated with a hard material film of TiN, and conventional three twist drills having configuration as shown in FIGS. 3(a) to (d) and FIG. 4, each made of a high-speed tool steel and coated with a hard material film of TiN. The sizes and specifications of the test drills and the cutting conditions conducted as the Example 2 are set to be the same as those of Example 1.

The results are also shown in Table 1, on the lower half thereof. From Table 1, it will be seen that similar results as those seen in Example 1 are obtained. That is, the conventional three twist drills exhibited poor results and that the total or life numbers of twist drills exhibited poor results and that the total or life number of bored holes of each of the drills ranged from 311 to 1566; mean value: 1035. The twist drills of the present invention exhibited excellent results that the total or life numbers of bored holes of each of the drills ranged from 7397 to 8033; mean value: 7655. Each of the drills of the present invention also prolonged its life to about seven (7) times as compared with those of the conventional drills, showed a very small amount of wear and chippings of its outer comers and the leading edges of the lands or margins, and enabled a long service life that stays sharp.

In the above Examples 1 and 2, drills made of the cemented carbide and coated with the hard material of TiAlN and drills made of a high-speed tool steel and coated with the hard material of TiN are tested However, as above-stated, since the present invention is characterized at least in the configuration of the outer cutting edges and the leading edge of the land or margin, it will be apparent that the present invention is also applicable to other twist drill made of other material and/or that of having other coating material.

What is claimed is:

1. A twist drill comprising:
    a drill body rotatable about an axis in a drill rotation direction and having an outer peripheral surface and a tip end;
    a pair of chip discharge flutes formed in the outer peripheral surface of said drill body;
    a pair of chisel edges formed on the tip end of said drill body, each of the pair of chisel edges having an outer end;
    a pair of inner cutting edges extending from each outer end of said chisel edges, each of the pair of inner cutting edges having an outer end;
    a pair of major cutting edges extending from each outer end of said inner cutting edges;
    a pair of outer cutting edges each receding relative to the drill rotation midway back from each of said major cutting edges at a first angle ($\alpha 1$) in a counter-direction of the drill rotation; and
    a pair of leading edges of lands each formed by a land and said outer cutting edge, each said leading edge having a linear or curved rake face;
    wherein a second angle ($\alpha 4$) of each said leading edge of the lands between the land and the linear or curved rake face of each said leading edge is an obtuse angle.

2. The twist drill according to claim 1, wherein each of the pair of outer cutting edges has a length and the length of one of said pair of outer cutting edges ranges from about 0.05 to about 0.20 of the diameter of the twist drill.

3. The twist drill according to claim 1, wherein the first angle ($\alpha 1$) between each said major cutting edges and each said outer cutting edges ranges from about 150 to about 175°.

4. The twist drill according to claim 1 characterized in that the twist drill is made of a high-speed steel.

5. The twist drill according to claim 1 characterized in that the twist drill is made of a cemented carbide.

6. The twist drill according to claim 4, characterized in that at least the tip end of the twist drill is coated with a Ti-based hard material film comprising at least one layer of at least one of TiN, TiC, TiCN, TiAlN, and TiAlNC.

7. The twist drill according to claim 5, characterized n that at least the tip end of the twist drill is coated with a Ti-based hard material film comprising at least one layer of at least one of TiN, TiC, TiCN, TiAlN, and TiAlNC.

8. A twist drill comprising:
    a drill body rotatable about an axis in a drill rotation direction and having an outer peripheral surface and a tip end;
    a pair of chip discharge flutes formed in the outer peripheral surface of said drill body;
    a pair of chisel edges formed on the tip end of said drill body, each of the pair of chisel edges having an outer end;
    a pair of inner cutting edges extending from each outer end of said chisel edges, each of the pair of inner cutting edges having an outer end;
    a pair of major cutting edges extending from each outer end of said inner cutting edges;
    a pair of outer cutting edges each receding relative to the drill rotation midway back from each of said major cutting edges at a first angle ($\alpha 1$) in a counter-direction of the drill rotation;
    a pair of leading edges of lands each formed by said land and said outer cutting edge, said leading edge having a linear or curved rake face;
    wherein a second angle ($\alpha 4$) of said leading edge of the land between the land and the linear or curved rake face of said leading edge is made to form an obtuse angle;
    wherein each of the pair of outer cutting edges has a length and the length of one of said pair of outer cutting edges ranges from about 0.05 to about 0.20 of the diameter of the twist drill; and
    wherein the first angle ($\alpha 1$) between said major cutting edges and said outer cutting edge ranges from about 150 to about 175°.

* * * * *